United States Patent

Beck

[15] 3,697,895

[45] Oct. 10, 1972

[54] IMPEDANCE TRANSFORMING BINARY HYBRID TREES

[72] Inventor: Alfred B. Beck, Torrance, Calif.

[73] Assignee: TRW Inc., Los Angeles, Calif.

[22] Filed: Aug. 3, 1970

[21] Appl. No.: 60,324

[52] U.S. Cl. ..........................333/8, 333/11, 333/32, 333/35

[51] Int. Cl...........H03h 7/38, H03h 7/48, H01p 5/12

[58] Field of Search...................333/11, 32, 35, 10, 6

[56] References Cited

UNITED STATES PATENTS

| | | | |
|---|---|---|---|
| 3,484,724 | 12/1969 | Podell | 333/11 X |
| 3,091,743 | 5/1963 | Wilkinson | 333/11 X |
| 3,444,475 | 5/1969 | Seidel | 333/11 X |

OTHER PUBLICATIONS

Wilkinson, An N-Way Hybrid Power Divider in IRE Transactions on Microwave Theory and Techniques Jan. 1960 Vol. MTT8 No. 1; Title Page & pp. 116–118.

Hindin, Standing -Wave Ratio of Binary TEM Power Dividers in IEE Transactions on Microwave Theory and Techniques February 1968 Vol. MTT 18 No. 2; pp. 123- 125.

Cohn–A Class of Broadband Three- Port TEM- Mode in IEEE Transactions on Microwave Theory and Techniques Feb. 1968 Vol. MTT 16 No. 2; Title Page & pp. 110- 116.

*Primary Examiner*—Herman Karl Saalbach
*Assistant Examiner*—Marvin Nussbaum
*Attorney*—Spensley, Horn & Lubitz

[57] ABSTRACT

Electrical power dividing or combining, and impedance transforming, binary tree circuits for an optimized output or input port isolation or an optimized VSWR across a predetermined frequency band, or a desired compromise between them, having cascaded tiers of multi-port hybrid circuits with each hybrid circuit having a bridging impedance connected across its arrayed ports. The circuits are derived from an even-mode synthesis of a prototype circuit having equal-ripple input reflection coefficient response across the predetermined frequency band, the bridging impedance values for the arrayed ports of each hybrid circuit being determined in accordance with the desired relationship between VSWR and port isolation by an even and odd-mode analysis of each hybrid circuit.

5 Claims, 14 Drawing Figures

ALFRED B. BECK
INVENTOR.

BY Spensley, Horn & Lubitz
ATTORNEYS

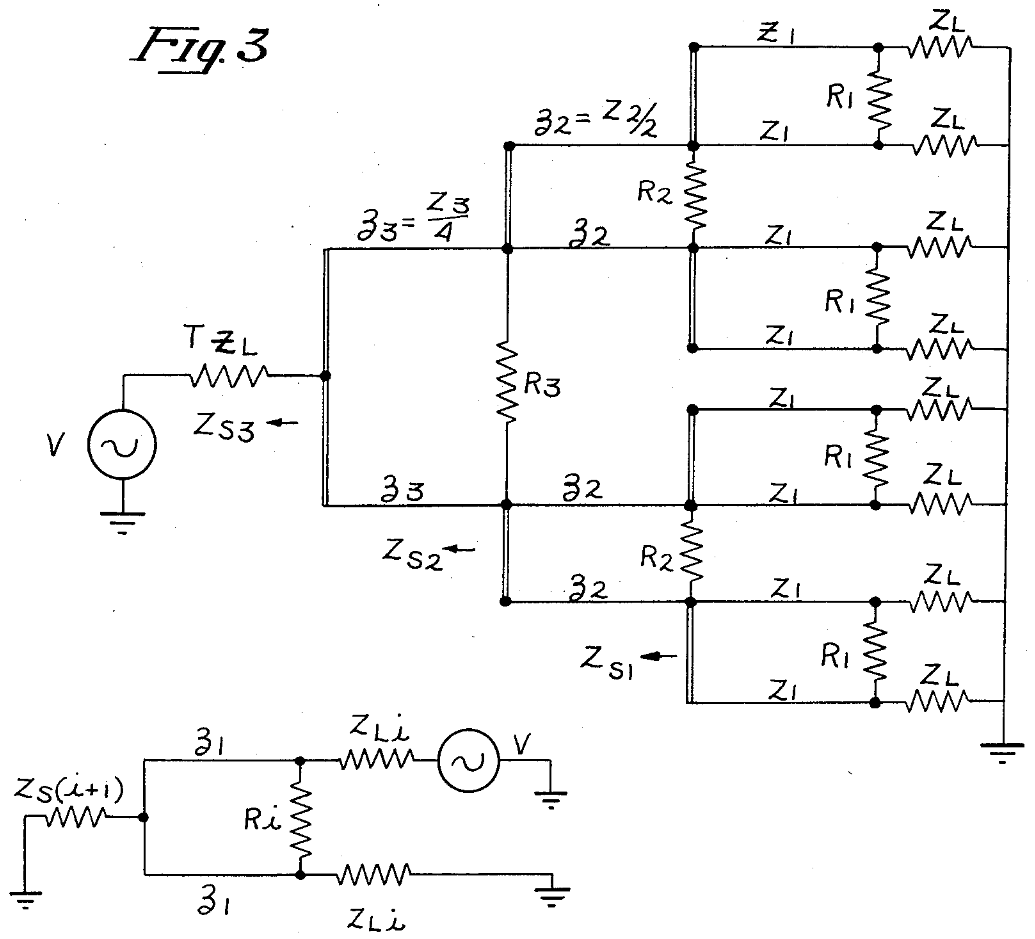
FIG. 3, FIG. 4-A
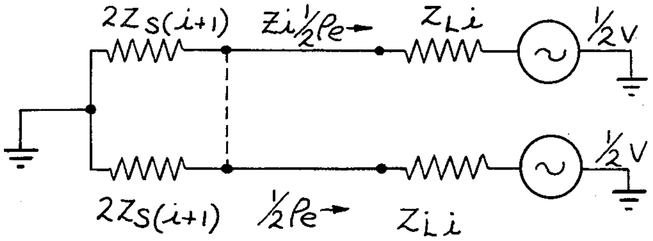
FIG. 4-B
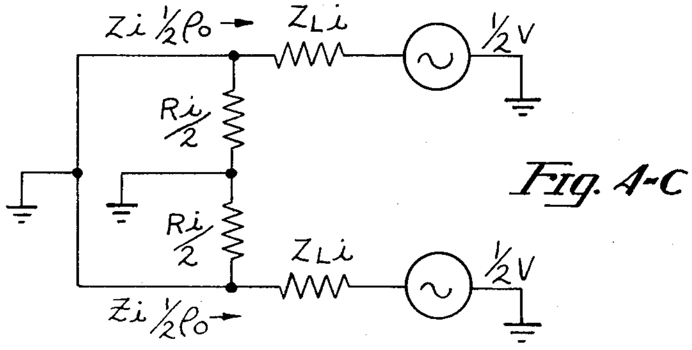
FIG. 4-C
ALFRED B. BECK
INVENTOR.
BY Spensley, Horn & Lubitz
ATTORNEYS

ALFRED B. BECK
INVENTOR.

BY Spensley, Horn & Lubitz
ATTORNEYS

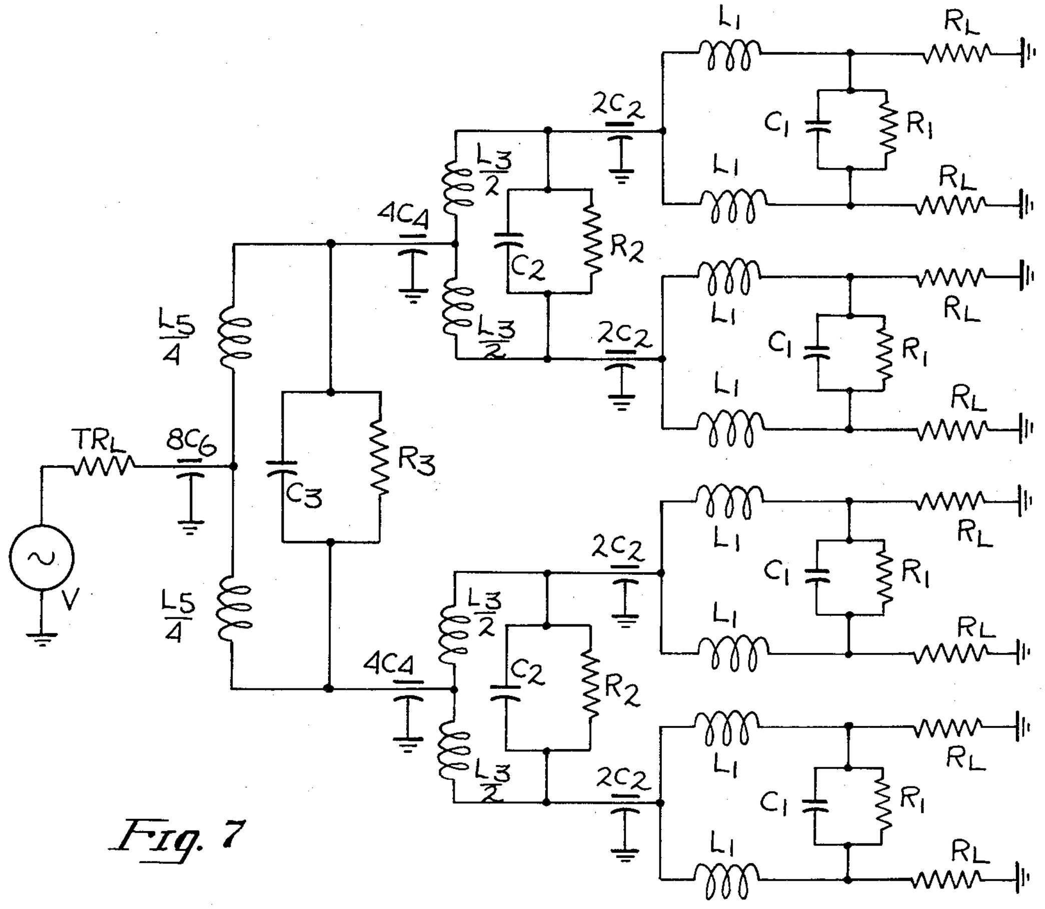
Fig. 7
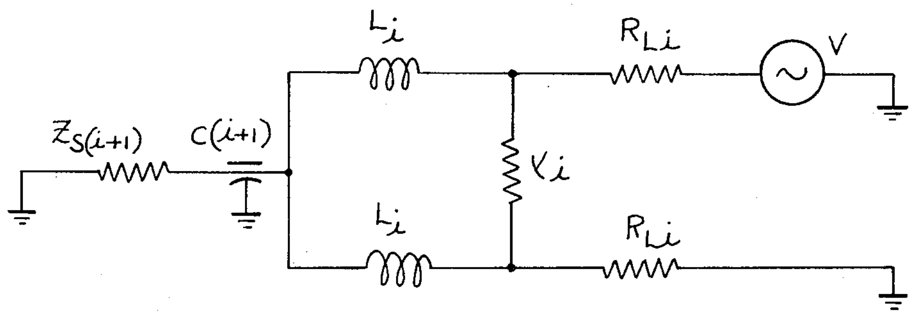
Fig. 8-A
ALFRED B. BECK
INVENTOR.
BY Spensley, Horn & Lubitz
ATTORNEYS FIG. 8-B
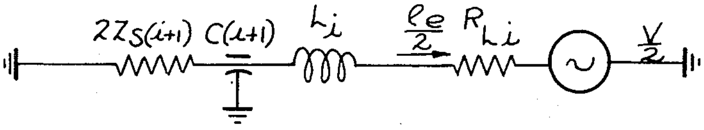
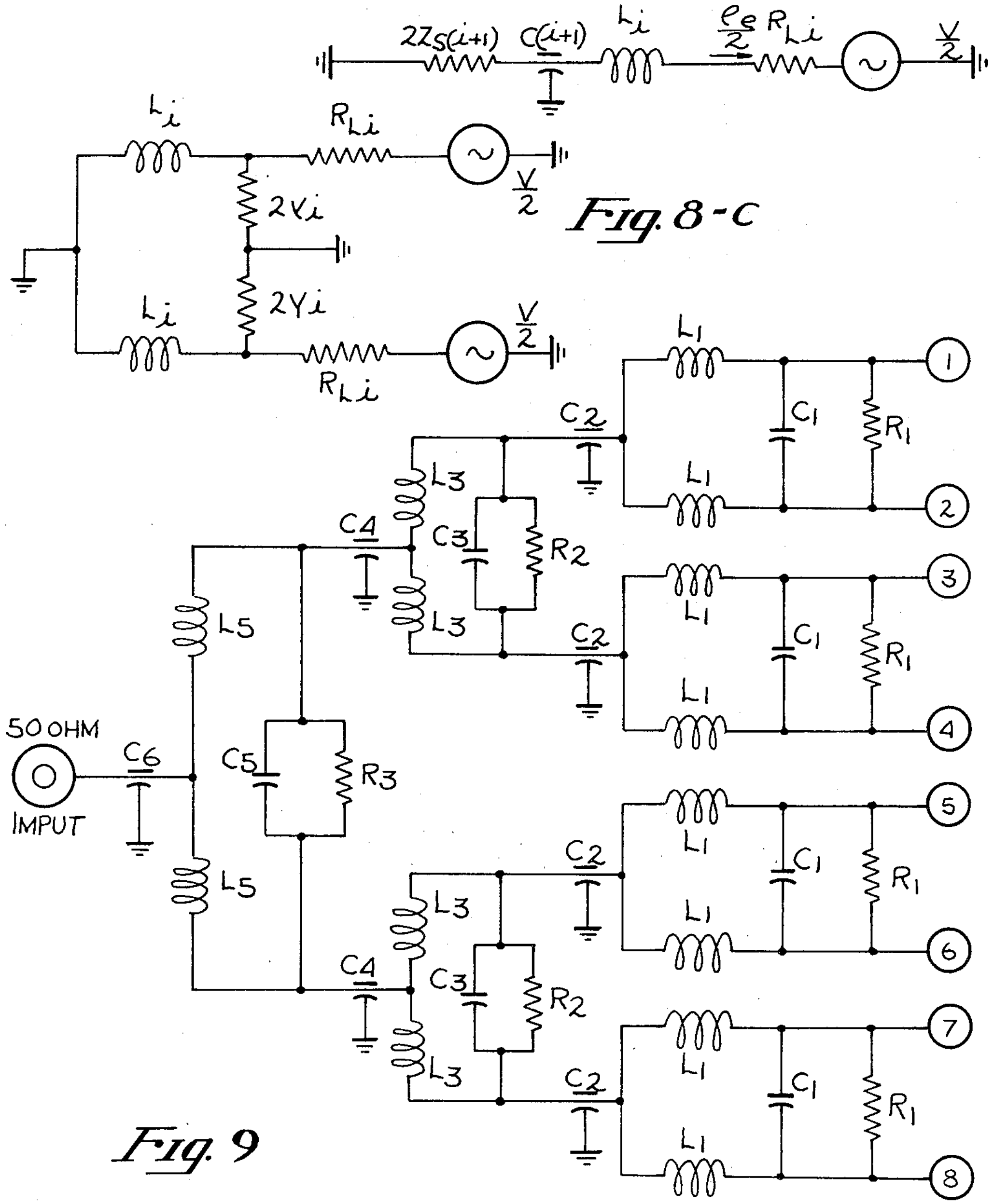
FIG. 8-C, FIG. 9
ALFRED B. BECK
INVENTOR
BY Spensley, Horn & Lubitz
ATTORNEYS ALFRED B BECK
INVENTOR
BY Spensley, Horn & Lubitz
ATTORNEYS

IMPEDANCE TRANSFORMING BINARY HYBRID TREES

BACKGROUND OF THE INVENTION

1. Field of the Invention

This invention relates to the field of microwave circuitry and more particularly to broadband impedance transforming circuitry.

2. Prior Art

Multi-port hybrid circuits having a common port intercoupled with an array of ports, for dividing a signal applied to its common port or combining a plurality of signals applied to its arrayed ports, are extensively employed in microwave circuitry. Binary hybrid trees have been widely used as multi-port power dividers and combiners, with conventional three-port hybrids as the basic building block achieving power division by positive powers of two. This prior art circuit is characterized by good arrayed port voltage standing-wave ratios (VSWR) and arrayed port isolation, and by equal input and output impedances. A presentation of the classical configuration of this type of circuit can be found in the article entitled "Standing-Wave Ratio of Binary TEM Power Dividers," pages 123–125 of the IEEE Transactions On Microwave Theory and Techniques, February 1968 (correspondence), and an analysis of the conventional three-port hybrid in the article entitled "A Class of Broadband Three-Port TEM-Mode Hybrids," pages 110–116 of the IEEE Transactions On Microwave Theory and Techniques, Vol. MTT–16, No. 2, February 1968.

However, there are many practical applications in which power splitting or combining concommitant with impedance transformation is desirable, such as, for example, in the paralleling of a number of solid-state amplifiers to achieve high output power. The desirability of impedance transformations has become even more important with the specification of a 50 ohm level as a standard for microwave equipment, the terminal impedance characteristics of practical solid-state active devices being typically higher or lower than 50 ohms. It has therefore been necessary when using a binary hybrid tree as a coupling circuit to accomplish any desired impedance transformation in additional circuitry, thereby usually increasing overall circuit complexity and cost, and in some cases restricting efficiency and bandwidth.

BRIEF SUMMARY OF THE INVENTION

The present invention is directed toward improved binary hybrid tree circuitry which provides impedance transformation, and without increasing circuit complexity. The present invention impedance transforming binary hybrid trees can be designed for an optimized VSWR across a desired frequency band, for an optimized output per isolation when used as a power divider across the desired frequency band (or for optimized input port isolation when used as a power combiner), of for a desired compromise between optimized VSWR or optimized arrayed port isolation.

The basic impedance transforming binary hybrid tree circuit comprises cascaded tiers of multi-port hybrid circuits forming a binary hybrid tree derived from an even-mode synthesis of a prototype circuit having equal-ripple input reflection coefficient response across the desired frequency band, each hybrid circuit having a bridging impedance connected across its arrayed ports, the value of the bridging impedances being determined in accordance with the desired relationship between VSWR and port isolation.

The starting point in the design of a present invention impedance transforming hybrid tree is a prototype impedance transforming circuit of equal-ripple input reflection coefficient response across the desired frequency band, which prototype circuit may be any elemental circuit of well defined characteristics suitable for translation into a multi-port hybrid circuit. An even-mode synthesis of the prototype circuit is performed to form a multi-branch structure and establish the characteristic impedance of the individual branches. More specifically, the even-mode synthesis is accomplished by appropriate connections between equipotential nodes among N adjacent prototypes excited by coherent, in-phase equal amplitude generators, where N is equal to the number of output ports desired in a power dividing configuration or to the number of input ports desired in a power combining configuration, and replacing the shorted sections by their lower impedance level equivalents. The final step in the circuit design is an even and odd-mode analysis for each of the resulting hybrid circuits to determine the optimal bridging impedance values for the arrayed ports of the hybrid circuits.

BRIEF DESCRIPTION OF THE DRAWINGS

FIG. 3 is a schematic diagram showing a binary hybrid tree developed from the circuit of FIG. 2;

FIG. 4–A shows the basic hybrid building block of the hybrid tree circuit of FIG. 3;

FIG. 4–B is the circuit obtained by an even-mode analysis of the circuit of FIG. 4–A;

FIG. 4–C is the circuit obtained by an odd-mode analysis of the circuit of FIG. 4–A;

FIG. 7 is a schematic diagram showing a binary hybrid tree developed from the circuit of FIG. 6;

FIG. 8–A shows the basic hybrid building block of the hybrid tree circuit of FIG. 7;

FIG. 8–B is the circuit obtained by an even-mode analysis of the circuit of FIG. 8–A;

FIG. 8–C is the circuit obtained by an odd-mode analysis of the circuit of FIG. 8–A;

FIG. 9 is the schematic diagram of a binary hybrid tree embodiment derived from the circuit of FIG. 7; and, FIG. 10 shows another embodiment of a binary hybrid tree circuit in accordance with the present invention.

DETAILED DESCRIPTION OF THE INVENTION

Figure 1:
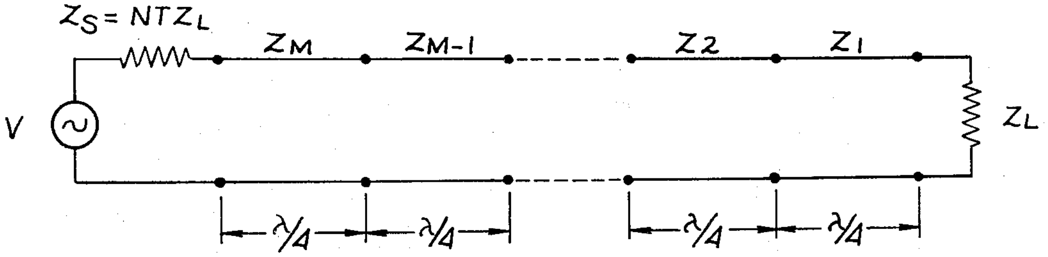
FIG. 1 is the schematic diagram of a prototype quarter-wave impedance transformer with cascaded sections.

Turning now to the drawings, as a first illustrative example there will be shown the development of an impedance transforming binary hybrid tree from a prototype cascaded quarter-wave impedance transformer, the schematic diagram of the prototype circuit being shown in FIG. 1. M sections of TEM-mode transmission lines are connected in series, excited by a source including a voltage generator V and its internal impedance $Z_S$, and terminated in a load impedance $Z_L$. The characteristic impedance of the transmission line sections are indicated as $Z_1, Z_2, --- Z_{M-1}, Z_M$, and their lengths being a quarter-wave (2λ4) at the center frequency $f_0$ of a desired frequency band between the frequencies $f_1$ and $f_2$. The impedance transformation ratio $T=Z_S \ NZ_L$, where $N$ represents the number of output ports. The number of sections in the prototype is determined by the number of output ports desired, in accordance with the relationship $M=\log_2(N)$.

This prototype is synthesized for optimized equal-ripple (Chebyshev) input reflection coefficient response across the desired frequency band between $f_1$ and $f_2$, with explicit design procedures and tabular data for many cases of interest being well known in the art, such as is shown in Chapter 6 (Stepped Impedance Transformers and Filter Prototypes) of the book entitled "Microwave Filter, Impedance-Matching Networks, and Coupling Structure," by Matthaei, Young and Jones, and in the article entitled "Theory and Design of Wide-Band Multisection Quarter-Wave Transformers," pages 179–185 of the Proceedings of the I.R.E., February 1955, for example. In such circuits the transducer attenuation and terminal characteristics of a lossless design (zero transmission line attenuation) exhibit arithmetical symmetry about the center frequency, $f_0$, a plot of total transducer attenuation as a function of ripple response characteristic showing a maximum number of equal ripples between the frequencies $f_1$ and $f_2$.

In this illustrative example the prototype cascaded quarter-wave impedance transformer of Chebyshev transducer attenuation characteristics will be used as the basis for the development of an eight-output binary power divider formed of tiers of cascaded three-port hybrid circuits. Although even lower VSWR ripple can be obtained by an ultimate circuit including one or more impedance transformer sections in addition to the hybrid tree, for ease of explanation the ultimate circuits of the herein presented examples will consist of three tiers of cascaded hybrid circuits. Thus, in this example $N=8$ and $M=3$. The first step in the translation of the prototype circuit into a binary hybrid tree is to perform an even-mode synthesis to form a suitable multi-branch structure and establish the characteristic impedance of the individual branches, the even-mode synthesis being accomplished by appropriate short-circuit connections between equipotential nodes among eight adjacent prototype quarter-wave transformers excited by coherent, in-phase equal amplitude generators. This is shown in FIG. 2, using the same reference characters for like parts as in FIG. 1.

Figure 2:
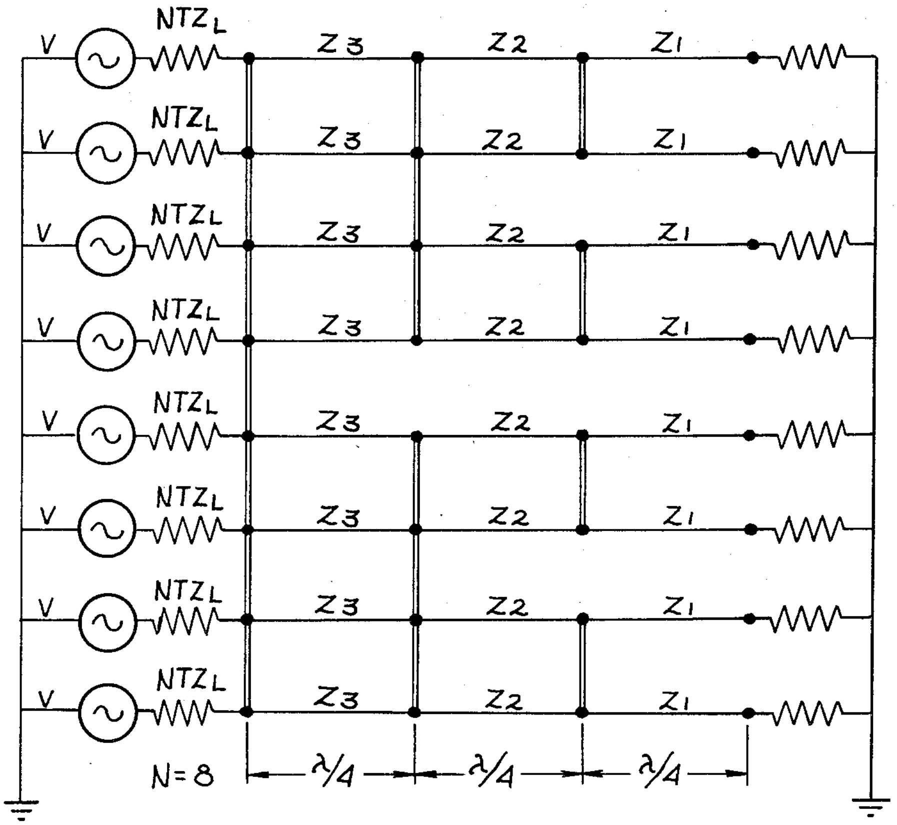
FIG. 2 is a schematic diagram showing a multi branch structure synthesized from the prototype circuit of FIG. 1.

The short-circuit connections are indicated by double vertical lines in FIG. 2, the lines being made double to emphasize that they represent short circuits and not lengths of transmission line as indicated by the horizontal single lines representing transmission line sections $Z_1$, $Z_2$ and $Z_3$. The pattern of short-circuit connections is determined by the desired ultimate circuit topology, which in this case is a binary tree formed of three tiers of cascaded three-port hybrid circuits, the first tier having four hybrid circuits, the second tier two, and the third tier one hybrid circuit.

Accordingly, the desired form of multi-branch structure is achieved by selecting the points to be short-circuited so as to simulate the input and output port connection pattern of the cascaded individual three-port hybrid circuits. Thus, the third tier is formed by short-circuiting the left hand ends of all the line sections $Z_3$ to thereby simulate the single input port fed by the voltage generators, short-circuiting the right hand ends of the four upper transmission line sections $Z_3$ to thereby simulate one of the pair of output ports (and one of the two input ports of the second tier), and short-circuiting the right hand ends of the four lower transmission line sections $Z_3$ to thereby simulate the other output port (and the other input port of the second tier). The shorting connection pattern for forming the junctions between the first and second tiers is developed in a similar manner and the simulation of the cascaded hybrid tree format can be easily visualized.

The even-mode synthesis is then completed by replacing the shorted sections with their lower impedance level equivalents and adding appropriate bridging impedances, the circuit them appearing as shown in FIG. 3, wherein the various impedance level equivalents are indicated by the symbols $z_1$, $z_2$ and $z_3$ for the respective first, second and third tiers. Again, as in FIG. 2, the double vertical lines indicate short circuits, and the individual three-port hybrid circuits now become readily apparent.

In general, the impedance level equivalents of the $i^{th}$ tier can be determined by induction, in accordance with the relationship:

$$z_i = 2^{(1-i)} Z_i = Z_i \ 2^{(i-1)}. \quad (1)$$

Although the bridging impedances in this example are specified as resistors, and indicated by the reference symbols $R_1$, $R_2$ and $R_3$, it is understood that complex impedances may be specified in certain applications.

The final phase in the design of the impedance transforming binary hybrid tree circuit is the determination of the optimal values of the various bridging resistors, by an even and odd-mode analysis of the basic hybrid building block shown in FIG. 4–A. Even and odd-mode analysis techniques (sometimes also known as the method of normal modes) are well known in the art and hence will not be discussed in great detail. An expository discussion can be found in the article entitled "A Method of Analysis of Symmetrical Four-Port Networks," pages 246–252 of the I.R.E. Transactions On Microwave Theory And Techniques, Vol. MTT–4, October 1956, and an application to three-port hybrids can be found in the above-referenced IEEE Transactions article entitled "A Class of Broadband Three-Port TEM-Mode Hybrids."

The even-mode analysis of FIG. 4–A yields the circuit of FIG. 4–B, and the odd-mode analysis yields the circuit of FIG. 4–C. By superimposition of the circuits of FIGS. 4–B and 4–C upon the circuit of FIG. 4–A, it is seen that the voltage waves emanating from the upper and lower ports can be expressed as:

$T_i = \frac{1}{2}(\rho_e + \rho_o)$ = output reflection coefficient at the $i^{th}$ node (2)

$T_i = \frac{1}{2}(\rho_e - \rho_o)$ = voltage transmission coefficient between output nodes of $i^{th}$ hybrid (3)

where $Z_{Li}$ = normalization resistance in the figures.

From FIG. 4–B, the even-mode reflection coefficient is (at $f_o$)

$$\rho_e = \frac{\frac{Z_i^2}{2Z_{s(i-1)}} - Z_{Li}}{\frac{Z_i^2}{2Z_{s(i-1)}} + Z_{Li}} = \frac{\frac{Z_i^2}{2Z_{s(i+1)}Z_{Li}} - 1}{\frac{Z_i^2}{2Z_{s(i-1)}Z_{Li}} + 1} \quad (4)$$

and from FIGURE 4–C, the odd-mode reflection coefficient is $$\rho_o = \frac{\frac{Ri}{2} - Z_{Li}}{\frac{Ri}{2} + Z_{Li}} = \frac{\frac{Ri}{2Z_{Li}} - 1}{\frac{Ri}{2Z_{Li}} + 1} \quad (5)$$

It is observed that both $\rho_e$ and $\rho_o$ are real at $f_o$.

If it is desired to obtain infinite isolation at $f_o$, then $T_i$ must equal zero, and as can be seen from equation (3) $\rho_o$ must equal $\rho_e$. Solving for $R_i$, by comparing terms in equations (4) and (5), yields the result:

$$Ri = \frac{Z_L^2}{Z_{s(i+1)}} \quad (6)$$

It is to be noted that when $\log_2(N)$ is odd, $\rho_e = \rho_o$, and hence $$Ri = 2Z_{Li} \text{ [for odd } \log_2(N)] \quad (7)$$

The meaning of $Z_{s(i+1)}$ and $Z_{Li}$ can be clarified by an inspection of FIG. 3. $Z_{Li}$ is the load resistance at the output ports of the $i^{th}$ hybrid (at $f_o$).

$$Z_{L1} = Z_L \quad (8)$$

$$Z_{L2} = \frac{Z_1^2}{2Z_L} \quad (9)$$

$$Z_{L3} = \frac{z_2^2 Z_L}{Z_1^2} = \frac{Z_2^2 Z_L}{4Z_i^2} \quad (10)$$

$$Z_{L4} = \frac{z_3^2 Z_1^2}{2z_2^2 Z_L} = \frac{Z_3^2 Z_1^2}{8Z_2^2 Z_L} \quad (11)$$

$$Z_{L5} = \frac{Z_4^2 Z_2 Z_L}{16 Z_3^2 Z_1^2} \quad (12)$$

The following recursion relationship for $Z_{s(i+1)}$ may be developed from an inspection of FIG. 3:

$$Z_{s(M+1)} = TZ_L \quad (13)$$

$$Z_{s(M)} = \frac{z_M^2}{2Z_{s(M+1)}} \quad (14)$$

$$Z_{s(M-1)} = \frac{z^2_{(M-1)}}{2Z_{s(M)}} \quad (15)$$

$$Z_{s(M-2)} = \frac{z^2_{(M-2)}}{2Z_{s(M-1)}} \quad (16)$$

$$Z_{s(2)} = \frac{Z_2^2}{2Z_{s(3)}} \quad (17)$$

The preceeding expressions for determination of the values of the various bridging resistors were based upon the desire to obtain infinite isolation at $f_o$. If, on the other hand, it is desired to optimize for low VSWR instead (at the expense of isolation), then when $\log_2(N)$ is even $T_i$ is set equal to zero. Then, since equation (4) is a bilinear relationship, one may immediately solve for $-\rho_e$.

$$-\rho_e = \frac{\frac{2Z_{s(i+1)}Z_{Li}}{Z_i^2} - 1}{\frac{2Z_{s(i+1)}Z_{Li}}{Z_i^2} + 1} = \rho_o \quad (18)$$

And by comparison of terms in equations (5) and (18), $R_i$ may be constrained as:

$$R_i = \frac{4Z_{s(i+1)}Z_{Li}^2}{Z_i^2} \text{ [for even } \log_2(N)] \quad (19)$$

Thus, at this point one has the choice of selecting the $R_i$ values for either maximum isolation or unity output VSWR, or some desired compromise between the two.

As an example of such a compromise, $R_i$ shall be selected for infinite $f_o$ isolation at the output ports of the first tier (output) hybrids, $$R_i = Z_1^2 / Z_{s(s)} \quad (20)$$

and the remaining $R_i$ values (second and third tiers) specified for unity $f_o$ output VSWR at the interior ports by using equation (14) for $i > 1$. This compromise is valid since a minimum of 6 db. of additional isolation is realized between ports of separate output hybrids.

The hereinabove-presented circuit development is particularly suitable for embodiment in microstripline circuitry form. In one exemplary embodiment the various microstrips were vapor deposited nichrome-gold on a 25 mil thick alumina substrate, the strips being defined by photolithographic techniques, and gold plated to greater than three skin depths. The bridging resistors were thick film ceramic chips, circuit fabrication being in accordance with now well-known techniques. A maximum VSWR of 1.75 and a minimum output port isolation of 10 db. was obtained over a frequency band of from 0.45 GHz to 1.05 GHz, impedance transformation being from a 50 ohm input port to eight 10-ohm output ports.

Because of the physical size of transmission line circuits (measured in wavelengths at the center frequency, $f_o$) a transmission line circuit realization of the present invention impedance transforming binary tree is restricted to frequencies in the UHF-to-microwave region (roughly 200 MHz to 10 GHz). However, a lumped-constant realization allows extension of the basic technique to the HF and VHF range (roughly 2 MHz to 500 MHz). Accordingly, there shall now be presented, by way of further example, the derivation of an impedance transforming binary hybrid tree from a suitable prototype impedance transforming circuit of lumped-constant form.

Figure 5:
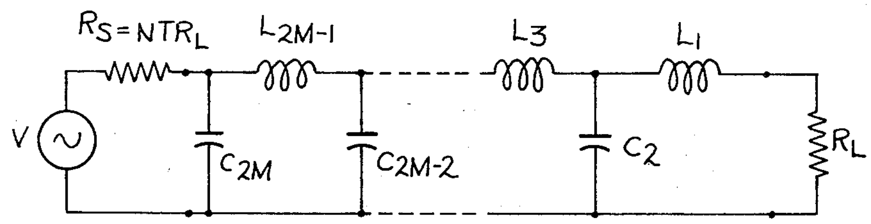
FIG. 5 is the schematic diagram of a prototype impedance transforming network of low-pass ladder form.

Turning now to FIG. 5 of the drawing, there is shown a prototype impedance transforming network of low-pass ladder form, comprising series inductances and shunt capacitances. The ladder sections are connected in series, excited by a source including a voltage generator V and its internal resistance $R_s$, and terminated by a load resistance $R_L$. The impedance transformation ratio, $T$, is then equal to $R_sNR_L$. Since there are two reactive elements in each ladder section, the minimum number of reactive elements in the prototype circuits will be $2M$ in accordance with the relationship $2M=2\log_2(N)$. Explicit design procedures and tabular data for many cases of interest are provided for this prototype circuit in the article entitled "Tables of Chebyshev Impedance — Transforming Networks of Low-Pass Filter Form," pages 939–963 of the IEEE Proceedings, August 1964. As explained hereinabove with reference to the transmission line prototype, a prototype synthesized for optimized equal-ripple (Chebyshev) input reflection coefficient response across the desired frequency band ($f_1$ to $f_2$) will exhibit arithmetical symmetry of its transducer attenuation and terminal characteristics about the center frequency, $f_o$. The response of the circuit from DC to the lower frequency limit, $f_1$, is similar to that of a cascaded quarter-wave transmission line transformer, while the response above the upper frequency, $f_2$, is similar to that of a low-pass filter.

Figure 6:
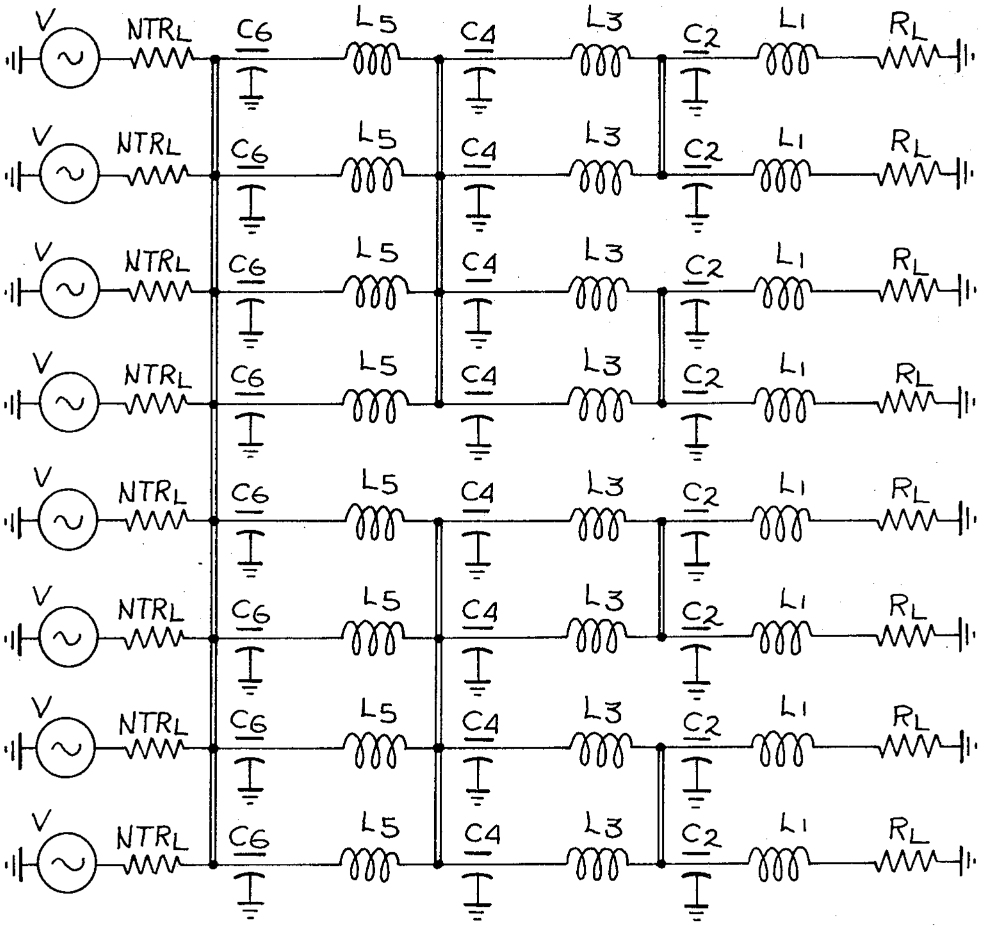
FIG. 6 is a schematic diagram showing a multi branch structure synthesized from the prototype circuit of FIG. 5.

The balanced-mode synthesis of the hybrid tree is accomplished by appropriate connections between equipotential nodes among M adjacent prototype impedance transforming low-pass ladder networks excited by coherent in-phase equal amplitude generators. Again proceeding with the development of an eight-output binary power divider formed of tiers of cascaded three-port hybrid circuits, the appropriate short-circuit connections are those which lead to the desired multi-branch structure formed of three tiers of cascaded three-port hybrid circuits, the first tier having four hybrid circuits, the second tier two, and the third tier one hybrid circuit. Again, the short-circuit connections are indicated by double lines, the balanced-mode synthesis being shown schematically in FIG. 6.

The synthesis is completed when the paralleled elements are replaced by their lower impedance level equivalents and appropriate bridging networks are added as shown in FIG. 7.

The values of the bridging network elements will be obtained by an even and odd-mode analysis of the basic three-port hybrid circuit shown in FIG. 8–A, FIG. 8–B indicating the circuit resulting from even-mode excitation, and FIG. 8–C indicating the circuit resulting from odd-mode excitation.

The voltage waves emanating from the upper and lower ports are found by superposition of the even and odd-mode excitations (FIGS. 8–B and 8–C), the symbol Y indicating admittance.

$T_i = ½(\rho_e + \rho_o)$ = output reflection coefficient (21)

$T_i = ½(\rho_e - \rho_o)$ = voltage transmission coefficient between adjacent output ports of hybrid (22)

The optimal synthesis of all bridging admittances is a formidable task. In general, it is difficult to evaluate $Z_{n(i+1)}$ and $R_{Li}$ within the interior of the tree. In fact, the apparent load impedance, $Z_{Li}$, seen by interior hybrids is in general complex. However, the optimum bridging admittance for the output hybrid can be easily derived and approximations for the interior, less-critical, hybrids have been established.

An output hybrid bridging admittance can be synthesized for infinite output isolation and/or unity output VSWR at a single frequency within the passband. The even (or balanced) mode output reflection coefficient ($\rho_e$) may be readily computed by first plotting transducer loss ($T_L$) versus frequency, the plotting points being most conveniently obtained through the use of computer equipment. The plot will show that the transducer loss exhibits an equal ripple behavior within the passband. At interior transducer loss minima, $\rho_e=0$, and at interior transducer loss maxima, $\rho_e$ is real and is given by the equation, $$\rho_e=\pm\sqrt{1-\frac{1}{\text{antilog}_{10}\,(T_L/10)}}\quad \text{[at interior passband transducer loss maxima]} \qquad (23)$$

The + sign is used if the computed balanced mode output impedance is greater than $R_L$ and the − sign is used if the output impedance is less than $R_L$.

The design passband width can be sometimes predistorted to a larger value than the desired passband coverage to minimize the attenuation at the upper edge of the desired passband. In practice, therefore, the transducer loss minima or maxima frequency ($f_{min}$ or $f_{max}$) is selected closest to the center frequency, $f_o$, of the desired passband to optimize the output hybrid bridging admittance. Two distinct cases arise:

Case 1. $\rho_e = 0$ (for $T_{L\,minima\,at} f_1$)

Since $\rho_e=0$, $\rho_o$ must also equal zero for unity output VSWR and infinite isolation (from equations 21 and 22). The optimum bridging admittance is ascertained by inspection of the odd-mode excitation circuit (FIG. 8–C) and is given by the equation:

$$Y_1 = 1/R_1 + j\,\omega_{min}\,C_1 \qquad (24)$$

where, $R_1 = 2R_L$ (25)

$$C_1=\frac{1}{2\omega_{min}^2 L_1} \qquad (26)$$

$$\omega_{min} = 2\pi F_{min} \qquad (27)$$

Case 2. $\rho_e = 0$ (for $T_L$ maxima at $f_{max}$). In this case, the bridging admittance is still given by equation (24), however, the optimum bridging resistance and capacitance are given by the following equations:

$$R_1=\frac{2R_L}{S_R}\,(R_o>R_L) \qquad (28)$$

$$R_1=2S_R R_L(R_o<R_L) \qquad (29)$$

$$C_1=\frac{1}{2\omega_{max}^2 L_1} \qquad (30)$$

where: $S_R$ = passband equal-ripple VSWR level, and $R_o$ = balanced-mode output resistance at $f_{max}$.

There will now be presented two synthesis methods for approximating the interior hybrid bridging admittances.

Method 1 comprises computing the output and load impedances of the individual internal hybrids as a function of frequency, locating a frequency near band center where $Z_{out}$ and $Z_L$ are nearly equal and using the formulas developed for the output hybrid to compute the optimum bridging admittance (equations 24–30).

In the second method, the bridging resistance values are computed for an equivalent transmission line impedance transforming binary hybrid tree and use them as a first approximation to optimum values for the lumped-constant design. The optimum bridging capacitors are computed from the following equation:

$$c_i = \frac{1}{2\omega_M^2 L_i} \quad (31)$$

where $$\omega_M = 2\pi f_M \quad (32)$$

Although tedious, the first method should provide excellent approximations. On the other hand, the second method can be easily employed since computer programs can be readily developed to calculate the parameters of transmission line impedance transforming binary hybrid trees. With either method, the final bridging admittance values for interior hybrids may be optimized experimentally in the laboratory or by the use of computing equipment.

The basic circuit of FIG. 8–A may be rather simply modified to achieve significant load mismatch isolation over moderate bandwidths by the addition of a quarter-wavelength of transmission line (with a characteristic impedance equal to $Z_L$) in series with every other output port, as disclosed in my copending patent application Ser. No. 60,325. The approximate reflected wave isolation realized by this technique is given by the following equation:

$$I(\text{db.}) = 10 \log_{10} (1/\sin^2 \quad (33)$$

where $\epsilon = (1 - f/f_o)\, 90°$, $f_o$ being the frequency at which the line is a quarter-wavelength long.

An eight output-port power divider in accordance with the derived circuit of FIG. 7 was fabricated for the frequency band of from 100–180 mHz and 50 ohm input and outputs, resulting in an embodiment having the following calculated circuit constant values, and a diagram as shown in FIG. 9:

| | |
|---|---|
| $L_1$ = 63.48 nhy | $C_1$ = 12 pfd |
| $L_3$ = 91.47 nhy | $C_2$ = 33.47 pfd |
| $L_5$ = 83.69 nhy | $C_3$ = 6.8 pfd |
| $R_1$ = 100 ohms | $C_4$ = 36.58 pfd |
| $R_2$ = 91 ohms | $C_5$ = 7.5 pfd |
| $R_3$ = 110 ohms | $C_6$ = 25.39 pfd |

Experimental optimization of the values for the interior hybrids (second and third tiers) yielded the following adjusted values, for optimization at a frequency of 125 mHz:

| | |
|---|---|
| $R_1$ = 90 ohms | $C_1$ = 12 pfd |
| $R_2$ = 110 ohms | $C_3$ = 9.1 pfd |
| $R_3$ = 90 ohms | $C_5$ = 10 pfd |

The embodiment performed essentially as predicted and it is seen that the calculated values for the bridging impedances are fairly close to the optimal.

Figure 10:
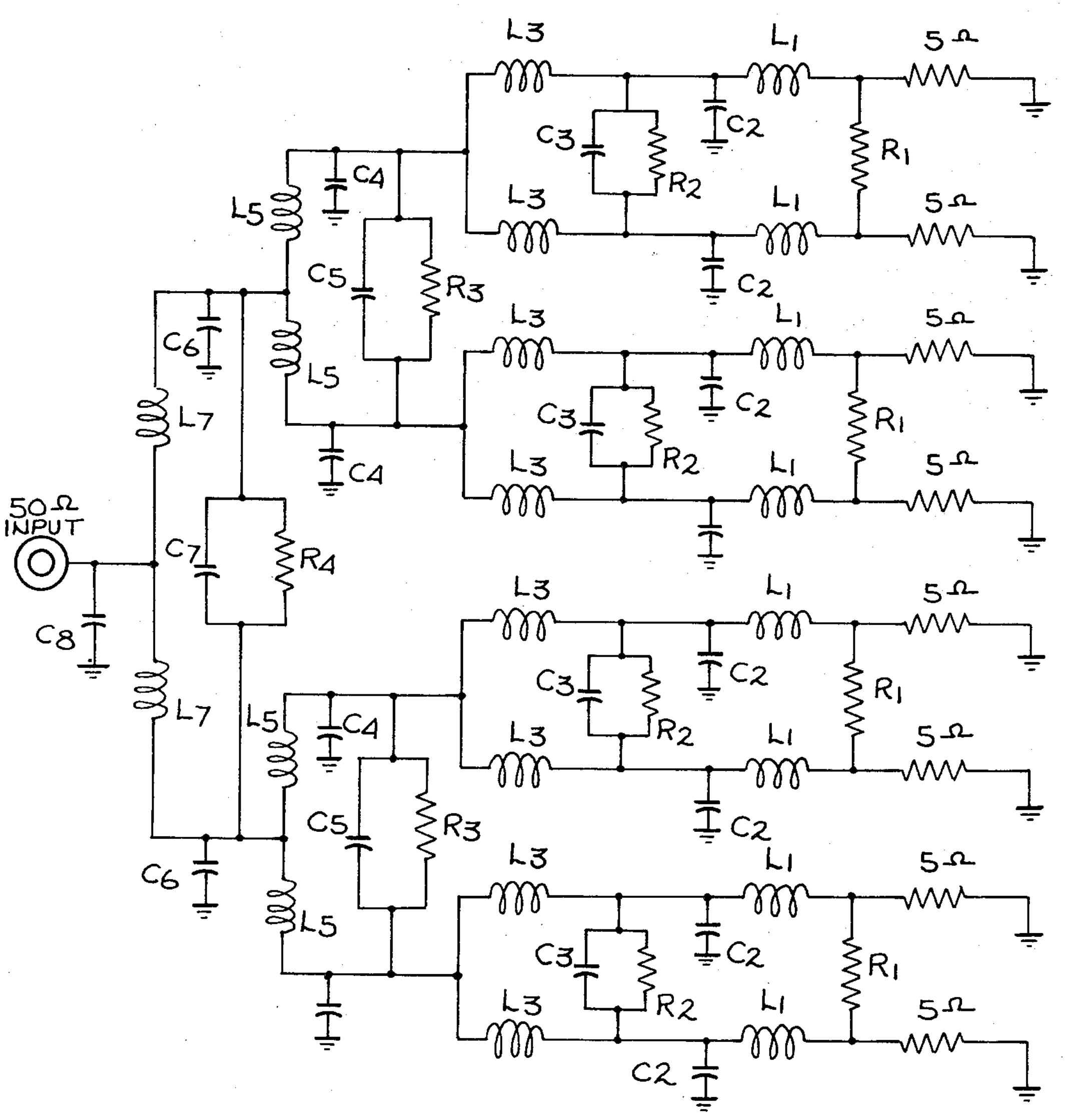

As a further explanation of the circuit of FIG. 7, an embodiment was developed to match a 50 ohm source to eight 5-ohm loads, two-section output hybrid (first tier) being used, this embodiment being shown schematically in FIG. 10, and intended for operation over a frequency band of from 100–180 mHz. The calculated circuit constant values are as follows:

| | |
|---|---|
| $L_1$ = 7.4568 nhy | $C_2$ = 148.343 pf |
| $L_3$ = 28.1712 nhy | $C_4$ = 108.05 pf |
| $L_5$ = 54.026 nhy | $C_6$ = 56.340 pf |
| $L_7$ = 74.173 nhy | $C_8$ = 29.308 pf |
| $R_1$ = 10 ohms | $C_1$ = 91 pfd |
| $R_2$ = 24 ohms | $C_3$ = 24 pfd |
| $R_3$ = 43 ohms | $C_5$ = 12 pfd |
| $R_4$ = 100 ohms | $C_7$ = 9.1 pfd |

Thus there has been described broadband, impedance transforming binary hybrid tree circuitry for multi-port power division, or combination, with no increase in complexity compared to conventional binary hybrid trees. Although the invention has been described with a certain degree of particularity, it is understood that the present disclosure has been made only by way of example and that numerous other circuits can be developed by use of the present invention circuit analysis concepts without departing from the spirit and scope of the invention as hereinafter claimed. For example, although three-port hybrids are used as the basic building blocks in the disclosed circuitry, these being presently preferred as a matter of practicality, other multi-port hybrids can be used. And, as hereinabove mentioned, additional quarter-wave input sections or elements can be used in addition to the binary tree to achieve even lower equal ripple-reflection coefficient levels.

I claim:

1. An electrical impedance transforming and power dividing or combining circuit for either an optimized VSWR or arrayed port isolation across a predetermined frequency band, or a desired compromise between them, comprising cascaded tiers of three-port hybrid circuits, each having a first port and a pair of arrayed ports, and together forming a binary hybrid tree derived from an even-mode synthesis of a prototype impedance transforming circuit of substantially uncoupled lumped constant low pass ladder form having equal ripple-input reflection coefficient response across said predetermined frequency band, each hybrid circuit of at least one tier having a bridging impedance connected across its arrayed ports, the values of the bridging impedances being determined by an even and odd-mode analysis of each hybrid circuit in accordance with the desired relationship between VSWR and arrayed port isolation.

2. Circuit as defined in claim 1, wherein said prototype circuit is a cascaded quarter-wave impedance transformer.

3. Circuit as defined in claim 1, wherein the values of the bridging impedances are determined for infinite midband isolation.

4. Circuit as defined in claim 1, wherein all of the hybrid circuits have a bridging impedance connected across their paired ports.

5. Circuit as defined in claim 1, wherein the hybrid circuits and bridging impedances of each tier are identical.

* * * * *